(12) United States Patent
Kato et al.

(10) Patent No.: US 8,201,880 B2
(45) Date of Patent: Jun. 19, 2012

(54) SEAT CUSHION COVERING STRUCTURE

(75) Inventors: Kohei Kato, Kariya (JP); Fumitoshi Akaike, Nissin (JP); Seiya Nishimura, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 217 days.

(21) Appl. No.: 12/564,954

(22) Filed: Sep. 23, 2009

(65) Prior Publication Data

US 2010/0096899 A1 Apr. 22, 2010

(30) Foreign Application Priority Data

Oct. 16, 2008 (JP) .................................. 2008-267508

(51) Int. Cl.
*A47C 7/74* (2006.01)
(52) U.S. Cl. ............. 297/180.12; 297/217.3; 297/452.6; 297/218.2
(58) Field of Classification Search ............. 297/180.12, 297/217.3, 452.6, 452.61, 218.2
See application file for complete search history.

(56) References Cited

U.S. PATENT DOCUMENTS

| | | | | |
|---|---|---|---|---|
| 4,558,905 A * | 12/1985 | Natori | ......................... | 297/452.6 |
| 4,695,091 A * | 9/1987 | Altmann et al. | ...... | 297/180.12 X |
| 4,927,209 A * | 5/1990 | Maruyama | ............... | 297/180.12 |
| 6,540,303 B2 * | 4/2003 | Mosquera | ............... | 297/180.12 |
| 6,609,752 B2 * | 8/2003 | Inoue | ..................... | 297/217.3 X |
| 6,733,072 B2 * | 5/2004 | Jaillet et al. | ............. | 297/180.12 |
| 2003/0071738 A1 | 4/2003 | Joly et al. | | |
| 2009/0146470 A1* | 6/2009 | Thompson et al. | ...... | 297/180.12 |

FOREIGN PATENT DOCUMENTS

JP 2003-50282 2/2003

OTHER PUBLICATIONS

English language Abstract of JP 2003-50282, Feb. 21, 2003.

* cited by examiner

*Primary Examiner* — Anthony D Barfield
(74) *Attorney, Agent, or Firm* — Greenblum & Bernstein P.L.C.

(57) ABSTRACT

A seat cushion covering structure includes a fabric seat cushion cover into which conductive fibers, electrically connected at one end to a conductive member, are woven, and a groove, which is formed in the seat cushion and into which the fabric seat cushion cover is tucked. The conductive member is provided in the groove.

3 Claims, 2 Drawing Sheets

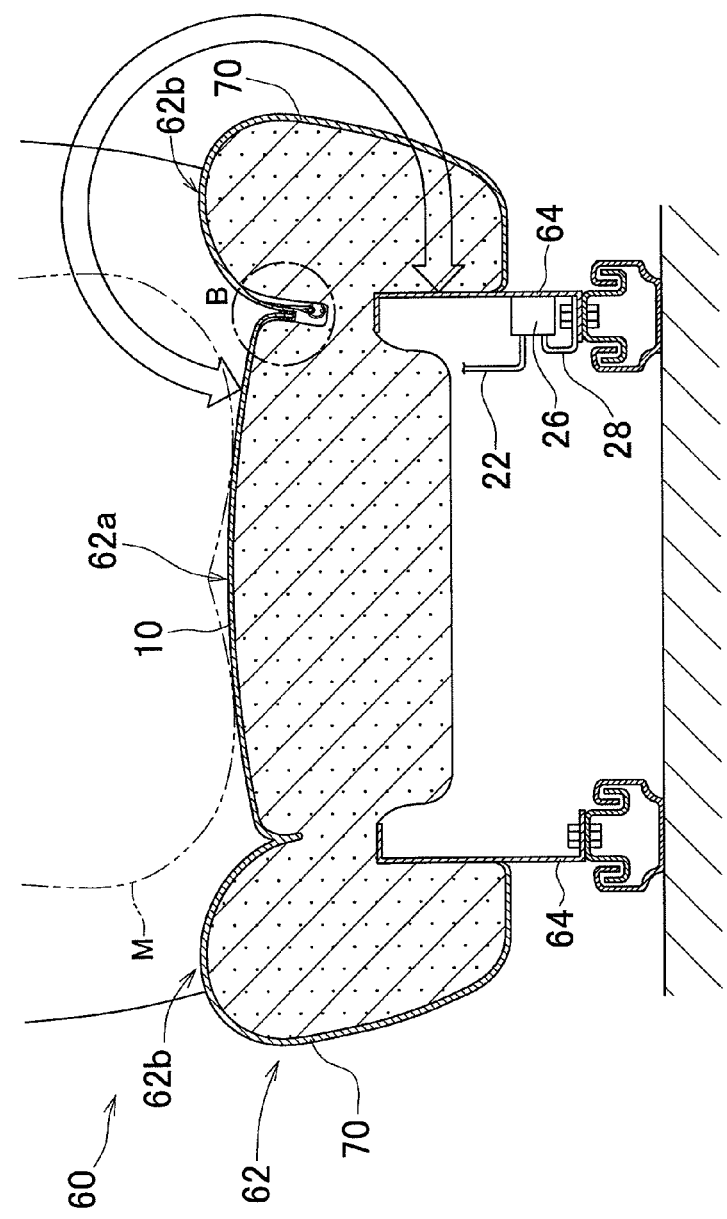

SEAT CUSHION COVERING STRUCTURE

INCORPORATION BY REFERENCE

The disclosure of Japanese Patent Application No. 2008-267508 filed on Oct. 16, 2008 including the specification, drawings and abstract is incorporated herein by reference in its entirety.

BACKGROUND OF THE INVENTION

1. Field of the Invention

The invention relates generally to a seat cushion covering structure. More specifically, the invention relates to a seat cushion covering structure in which conductive fibers, electrically connected to a conductive member at one end, are woven into a fabric seat cushion cover.

2. Description of the Related Art

Whether an occupant is seated in a vehicle seat may be determined based on, for example, the capacitance of conductive fibers (e.g. conductive wires) woven into the cover of a seat cushion. With this technology, when the vehicle is involved in a collision, a control to prevent deployment of an airbag for an unoccupied vehicle seat may be executed.

For example, Japanese Patent Application Publication No. 2003-50282 (JP-A-2003-50282) describes the technology that relates to the present invention.

In the above-described technology, one end of each conductive fiber is electrically connected to a conductive member (e.g. copper tape) and the conductive member connected to conductive fibers is electrically connected to a capacitance detector via a cable so that the conductive fibers are electrically connected to the capacitance detector. Because the conductive member is placed right under the seat cushion cover, the conductive member may cause discomfort to an occupant seated on the seat cushion.

SUMMARY OF THE INVENTION

The invention provides a seat cushion covering structure that includes a fabric seat cushion cover into which conductive fibers, electrically connected at one end to a conductive member, are woven, and that does not cause discomfort to an occupant seated on the seat cushion.

An aspect of the invention relates to a seat cushion covering structure that includes a fabric seat cushion cover into which conductive fibers, electrically connected at one end to a conductive member, are woven, and a groove, which is formed in the seat cushion and into which the fabric seat cushion cover is tucked. The conductive member is provided in the groove. With this structure, an occupant seated on the seat cushion does not feel uncomfortable because the conductive member (e.g. copper tape) is provided in the groove. Therefore, it is possible to avoid causing discomfort to the occupant due to the conductive member.

In the seat cushion covering structure according to the aspect of the invention, the groove may be formed between a seating surface of the seat cushion and a thigh bolster, which is provided on a lateral side of the seating surface, and the conductive member may be provided in the groove that is nearest to the lateral center of the vehicle. In this structure, the conductive member is provided in the groove that is nearest to the lateral center of the vehicle. In other words, the conductive member is arranged in the groove that is formed in a portion of the vehicle seat, which is on the opposite side of a portion of the vehicle seat, which is close to the vehicle door. Accordingly, it is possible to suppress abrasion of the conductive member that may occur when the occupant gets on and off the vehicle seat.

BRIEF DESCRIPTION OF THE DRAWINGS

The features, advantages, and technical and industrial significance of this invention will be described in the following detailed description of an example embodiment of the invention with reference to the accompanying drawings, wherein the same or corresponding portions will be denoted by the same reference numerals and wherein:

FIG. 2A is a cross-sectional view taken along the line II-II in FIG. 1A; and

FIG. 2B is an enlarged view showing a portion of the seat cushion covering structure in FIG. 2A.

DETAILED DESCRIPTION OF THE EMBODIMENT

Figure 1A:
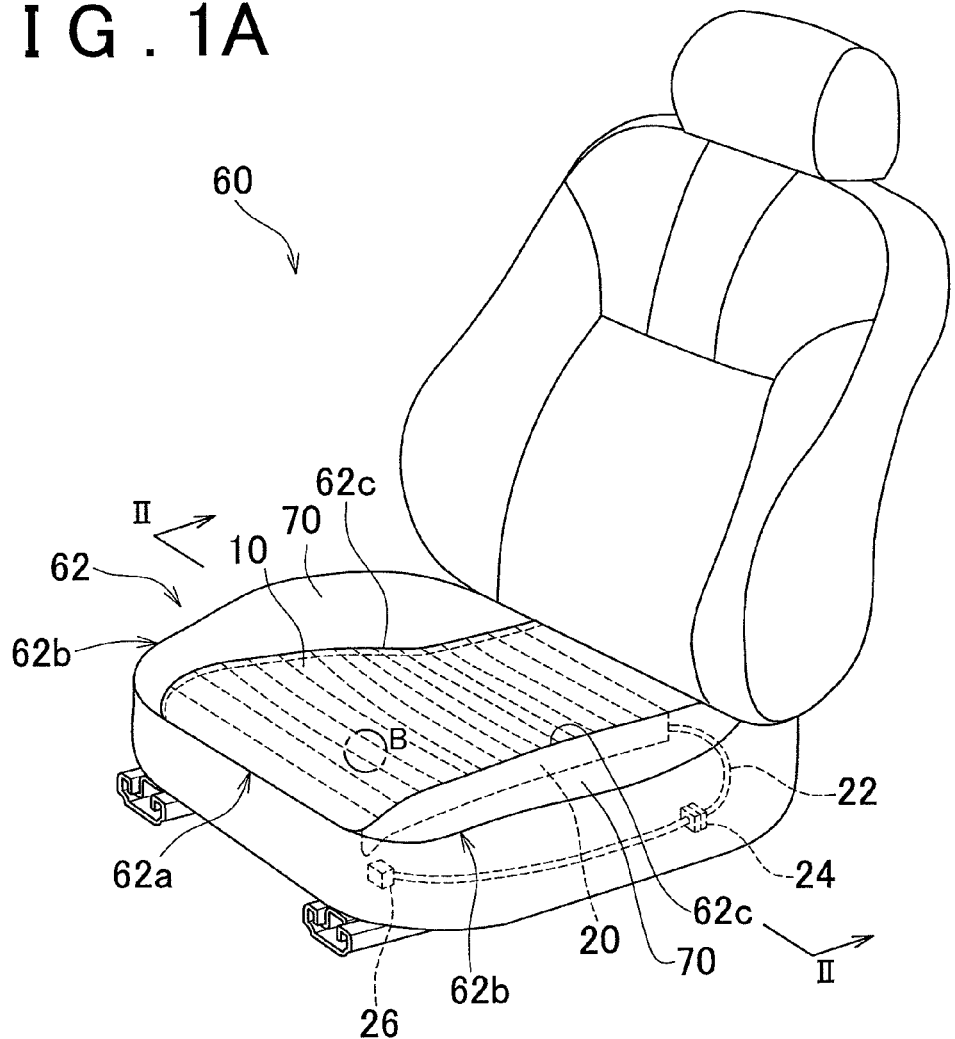
FIG. 1A is a perspective view showing a vehicle seat to which a seat cushion covering structure according to an embodiment of the invention is applied.

An embodiment of the invention will be described below with reference to FIG. 1 and FIG. 2. FIG. 1A is a perspective view showing a vehicle seat to which a seat cushion covering structure according to the embodiment of the invention is applied. FIG. 2A is a cross-sectional view taken along the line II-II in FIG. 1A. As shown in FIG. 1A, in the embodiment of the invention described below, fabric 10 is used as a cover for a seating surface 62a of a seat cushion 62 in the vehicle seat 60.

Figure 1B:
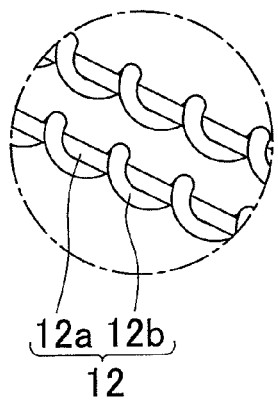
FIG. 1B is an enlarged view showing a portion of the seat cushion covering structure in FIG. 1A.

First, the structure of the fabric 10 will be described with reference to FIG. 1A and FIG. 1B. Multiple composite threads 12, each of which is formed of a conductive fiber 12a and a non-conductive thread 12b wound around the conductive fiber 12a, are woven into the fabric 10 in such a manner that the composite threads 12 extend in a predetermined direction (e.g. lateral direction of the vehicle) and arranged at predetermined intervals. The conductive fibers 12a may be, for example, stainless fibers, and the non-conductive threads 12b may be, for example, twisted threads.

A copper tape 20, which is a conductive member, is attached to one end portions of the conductive fibers 12a in the fabric 10 in such a manner that the one end portions of the conductive fibers are electrically connected to each other. With this structure, the conductive fibers 12a are electrically connected to each other.

The structure of the seating portion of the seat cushion 62 that is covered with the above-described fabric 10 will be described in detail. The seating portion of the seat cushion 62 includes the seating surface 62a on which an occupant is seated, and thigh bolsters 62b, 62b that are provided on each lateral side of the seating surface 62a. A groove 62c is formed between the seating surface 62a and one of the thigh bolsters 62b, and another groove 62c is formed between the seating surface 62a and the other thigh bolster 62b. The fabric 10 covers the seating surface 62a of the seat cushion 62 in such a manner that the copper tape 20 is positioned in the groove 62c that is located nearest to the lateral center of the vehicle.

A fabric 70 covers the thigh bolster 62b of the seat cushion 62A, and a cotton cloth 72 is sewn on one end of the fabric 70, which is in the groove 62c. A wire 72a is connected via the cotton cloth 72 to the one end of the fabric 70 (see FIG. 2B). The wire 72a and a wire 62d provided in the groove 62c are both hooked on a C-ring 74. With this structure, the thigh bolster 62b of the seat cushion 62 is covered with the fabric 70 with a tension applied to the surface of the thigh bolster 62b.

The electrical structure of the above-described fabric 10 will be described with reference to FIG. 1A. A capacitance detector 26 is fitted to a cushion frame 64 (not shown in FIG. 1) of the seat cushion 62. One of the terminals of the capacitance detector 26 is electrically connected to the copper tape 20 attached to the fabric 10 via a first cable 22 provided with a connector 24 at its middle portion. In addition, the other terminal of the capacitance detector 26 is electrically connected to the cushion frame 64 via a second cable 28 (see FIG. 2A).

The cushion frame 64 is made of conductive material (e.g. aluminum). Therefore, the capacitance detector 26 detects the change in capacitance of the conductive fibers 12a when an occupant is seated in the vehicle seat 60 (as shown by an arrowed line in FIG. 2A). Accordingly, as in the case of the related art, it is possible to determine whether the vehicle seat 60 is occupied. As a result, for example, if the vehicle is involved in a collision, a control to prevent deployment of an airbag for an unoccupied vehicle seat may be executed.

The seat cushion covering structure according to one embodiment of the invention has been described so far. With this structure, an occupant seated on the seat cushion 62 does not feel uncomfortable because the copper tape 20 is provided in the groove 62c. Therefore, it is possible to avoid causing discomfort to the occupant due to the copper tape 20.

In this structure, the copper tape 20 is provided in the groove 62c that is closest to the lateral center of the vehicle. In other words, the copper tape 20 is provided in the groove 62c that is formed in a portion of the vehicle seat, which is on the opposite side of a portion of the vehicle seat, which is close to the vehicle door. Accordingly, it is possible to suppress abrasion of the copper tape 20 that may occur when the occupant gets on and off the vehicle seat.

What is claimed is:

1. A seat cushion covering structure, comprising:
   a fabric seat cushion cover into which conductive fibers, electrically connected at one end to a conductive member, are woven; and
   a groove which is formed in a seat cushion, and into which one end of the fabric seat cushion cover is tucked,
   wherein the conductive member comprises copper tape and is provided in the groove, and
   wherein at least a portion of the conductive member is positioned between a side wall of the groove and a portion of the fabric seat cushion cover that extends into the groove.

2. The seat cushion covering structure according to claim 1, wherein:
   the groove is formed between a seating surface of the seat cushion and a thigh bolster, which is provided on a lateral side of the seating surface; and
   the conductive member is provided in the groove that is nearest to a lateral center of a vehicle in which the seat cushion is provided.

3. The seat cushion covering structure according to claim 1, wherein:
   the conductive member is fitted to one end of fabric that forms the fabric seat cushion cover, which covers a seating surface of the seat cushion; and
   the end of the fabric is tucked into the groove in such a manner that entirety of the conductive member fits in the groove.

* * * * *